B. J. SCHWARZ, N. FORISTER, AND A. HIRT.
CAP VISOR AND LAMP SUPPORT.
APPLICATION FILED NOV. 27, 1920.

1,428,453.

Patented Sept. 5, 1922.

B.J. SCHWARZ,
N. FORISTER AND
A. HIRT,

INVENTORS

WITNESS·

BY

ATTORNEY

Patented Sept. 5, 1922.

1,428,453

UNITED STATES PATENT OFFICE.

BENJAMIN J. SCHWARZ, NELSON FORISTER, AND ALBERT HIRT, OF BREEZE, ILLINOIS.

CAP VISOR AND LAMP SUPPORT.

Application filed November 27, 1920. Serial No. 426,803.

*To all whom it may concern:*

Be it known that we, BENJAMIN J. SCHWARZ, NELSON FORISTER, and ALBERT HIRT, citizens of the United States, residing at Breeze, in the county of Clinton and State of Illinois, have invented new and useful Improvements in Cap Visors and Lamp Supports, of which the following is a specification.

This invention relates to miner's caps, and has for its principal object the provision of a combined lamp support and visor which is constructed from a single piece of non-corrosive material and detachably connected to the crown of the cap so that when a cap becomes worn or soiled beyond further use, the combined lamp support and visor can be removed and associated with another cap.

The nature and advantages of the invention will be better understood when the following detail description is read in connection with the accompanying drawings the invention residing in combination, construction and arrangement of parts as claimed.

In the drawing forming part of this application, like numerals of reference indicate the similar parts in the several views and wherein:—

Figure 1:
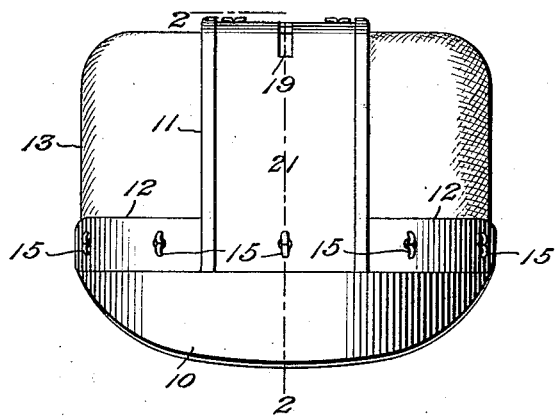
Figure 1 is a view of a miner's cap showing the invention associated therewith.
Figure 2:
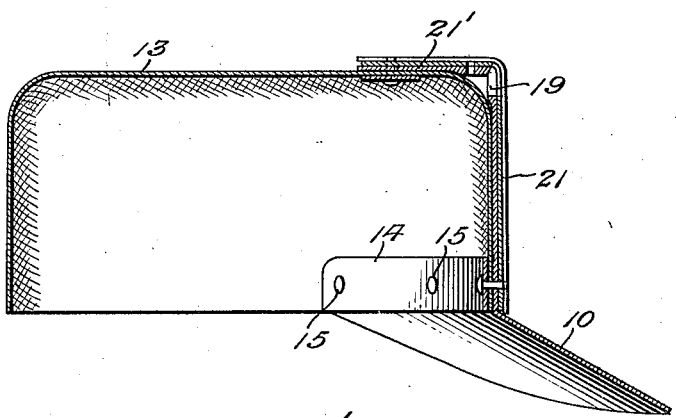
Fig. 2 is a sectional view taken on line 2—2 of Figure 1.
Figure 3:
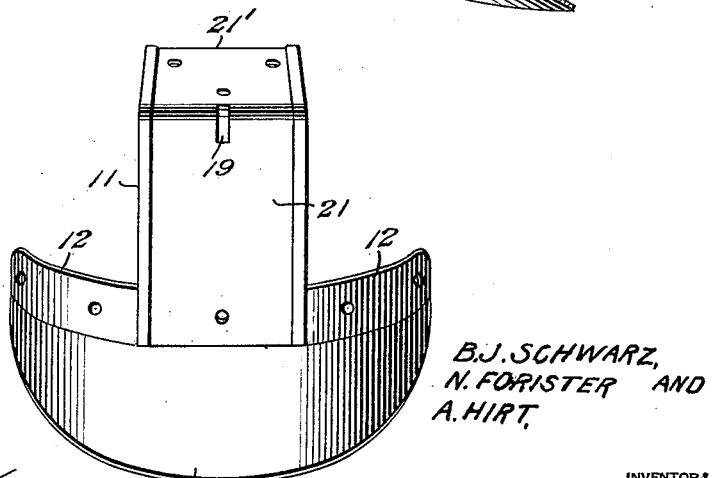
Figure 3 is a perspective view of the combined lamp support and visor.

The article forming the subject matter of my invention is constructed from a single piece of suitable non-corrosive material, preferably aluminum and embodies a visor 10 and a lamp support 11. The visor includes an attaching flange 12 which is shaped to conform to the curvature of the lower portion of the crown 13 to which it is secured. Arranged within the crown 13 is a metallic strip 14 having openings registering with openings in the attaching flange 12 to receive fastening elements 15 which secures the visor to the crown of the cap in a manner so that it can be separated therefrom when desired. The cap is provided with the usual opening 19 to accommodate the miner's lamp (not shown) and the material is slightly thicker at this point than at any other place in its area. The article is very light in weight and can be manufactured and sold at a very nominal cost.

The support has a portion overlapping the cap and indicated at 21. This portion is secured to the crown of the cap in any suitable manner. The support 11 is preferably provided with leather or the like 21 to prevent the lamp (not shown) from rubbing against the metal.

While it is believed that from the foregoing description the nature and advantages of the invention will be readily apparent, we desire to have it understood that we do not limit ourselves to what is herein shown and described, and that such changes may be resorted to when desired as fall within the scope of what is claimed.

What we claim is:—

A combined lamp support and visor for miner's caps comprising a single piece of material shaped to provide the visor, and an attaching flange curved to conform to the curvature of the crown of the cap, said flange being perforated, a lamp support rising from the visor centrally thereof and arranged directly in advance of the cap, the upper end of said support being offset at a right angle to repose upon the top of the cap, means for securing the offset portion to the top of said cap, said lamp support having a slot at the upper end thereof, and a metallic strip arranged within the cap and in parallel relation to said flange, and means for securing the said strip and flange together.

In testimony whereof we affix our signatures.

BEN. J. SCHWARZ.
NELSON FORISTER.
ALBERT HIRT.